United States Patent
Thomas et al.

(10) Patent No.: US 9,595,160 B2
(45) Date of Patent: Mar. 14, 2017

(54) WAGERING GAME COMMUNITY ENVIRONMENT

(71) Applicant: Bally Gaming, Inc., Las Vegas, NV (US)

(72) Inventors: Alfred Thomas, Las Vegas, NV (US); Mark B. Gagner, West Chicago, IL (US); Vernon W. Hamlin, Lisle, IL (US); Jeremy M. Hornik, Chicago, IL (US); Michael W. Mastropietro, Chicago, IL (US); Kathleen J. McJohn, Lake Forest, IL (US); Larry J. Pacey, Northbrook, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

(21) Appl. No.: 14/942,848

(22) Filed: Nov. 16, 2015

(65) Prior Publication Data

US 2016/0071364 A1    Mar. 10, 2016

Related U.S. Application Data

(63) Continuation of application No. 13/442,723, filed on Apr. 9, 2012, now Pat. No. 9,189,925, which is a
(Continued)

(51) Int. Cl.
*G06F 17/00* (2006.01)
*G07F 17/32* (2006.01)
*G06Q 30/02* (2012.01)

(52) U.S. Cl.
CPC ......... *G07F 17/3223* (2013.01); *G06Q 30/02* (2013.01); *G07F 17/32* (2013.01);
(Continued)

(58) Field of Classification Search
USPC ......................................... 463/16–25, 40–42
See application file for complete search history.

(56) References Cited

U.S. PATENT DOCUMENTS

| | | |
|---|---|---|
| 6,454,265 B1 | 9/2002 | Elliott et al. |
| 6,984,174 B2 | 1/2006 | Cannon et al. |
| | (Continued) | |

FOREIGN PATENT DOCUMENTS

| | | |
|---|---|---|
| GB | 2457391 | 8/2009 |
| WO | WO2006014833 | 2/2006 |
| | (Continued) | |

OTHER PUBLICATIONS

"CA Application No. 2666944 Examiners Report", Nov. 18, 2015, 4 pages.
(Continued)

*Primary Examiner* — Ronald Laneau
(74) *Attorney, Agent, or Firm* — DeLizio Law, PLLC

(57) ABSTRACT

A wagering game community environment is described herein. In some embodiments, the environment includes a community server to provide services for a wagering game community. In some embodiments, the community server comprises a communications controller configured to receive communications from community terminals and to send the communications to wagering game machines. In some embodiments, the community server also includes a promotions controller configured to award promotional material to members of the virtual community based on their use of the community terminals, the promotional material being for use in wagering games available on the wagering game machines.

17 Claims, 9 Drawing Sheets

Related U.S. Application Data continuation of application No. 12/445,961, filed as application No. PCT/US2007/081795 on Oct. 18, 2007, now Pat. No. 8,172,687.

(60) Provisional application No. 60/862,395, filed on Oct. 20, 2006.

(52) U.S. Cl.
CPC ...... *G07F 17/3227* (2013.01); *G07F 17/3232* (2013.01); *G07F 17/3255* (2013.01); *G07F 17/3272* (2013.01)

(56) References Cited

U.S. PATENT DOCUMENTS

| | | | |
|---|---|---|---|
| 7,963,847 | B2 | 6/2011 | Baerlocher |
| 8,172,687 | B2 * | 5/2012 | Gagner .................. G06Q 30/02 463/42 |
| 8,235,811 | B2 | 8/2012 | Joshi et al. |
| 8,702,508 | B2 * | 4/2014 | Gura .................. G07F 17/3276 463/31 |
| 8,784,216 | B2 * | 7/2014 | Thomas .................. G06Q 30/02 463/42 |
| 9,189,925 | B2 | 11/2015 | Gagner et al. |
| 9,286,759 | B2 * | 3/2016 | Barclay ............... G07F 17/3244 |
| 2001/0004609 | A1 | 6/2001 | Walker et al. |
| 2003/0032474 | A1 | 2/2003 | Kaminkow |
| 2003/0032479 | A1 | 2/2003 | LeMay et al. |
| 2004/0127284 | A1 | 7/2004 | Walker et al. |
| 2004/0142750 | A1 | 7/2004 | Glisson et al. |
| 2004/0162144 | A1 | 8/2004 | Loose et al. |
| 2004/0259633 | A1 | 12/2004 | Gentles et al. |
| 2005/0170883 | A1 | 8/2005 | Muskin |
| 2005/0282603 | A1 | 12/2005 | Parrott et al. |
| 2006/0068909 | A1 | 3/2006 | Pryzby et al. |
| 2006/0154714 | A1 | 7/2006 | Montross et al. |
| 2006/0205497 | A1 | 9/2006 | Wells et al. |
| 2008/0070697 | A1 | 3/2008 | Robinson et al. |
| 2009/0124351 | A1 | 5/2009 | DeWaal et al. |
| 2010/0087247 | A1 | 4/2010 | Joshi et al. |
| 2010/0317442 | A1 | 12/2010 | Thomas et al. |
| 2011/0212785 | A1 | 9/2011 | Gura et al. |
| 2012/0202588 | A1 | 8/2012 | Gagner et al. |
| 2013/0040730 | A1 | 2/2013 | Barclay et al. |
| 2013/0095914 | A1 | 4/2013 | Allen et al. |
| 2013/0130781 | A1 | 5/2013 | Anderson et al. |

FOREIGN PATENT DOCUMENTS

| | | |
|---|---|---|
| WO | WO2008022323 | 2/2008 |
| WO | WO2008051796 | 5/2008 |
| WO | WO02/30534 | 4/2011 |

OTHER PUBLICATIONS

"CA Application No. 2,666,944 Office Action", Sep. 18, 2014, 4 pages.
"PCT Application No. PCT/US07/81795 International Preliminary Report on Patentability", Jun. 18, 2009, 12 pages.
"PCT Application No. PCT/US2007/081795 International Search Report", May 8, 2008, 9 pages.
"UK Application No. 0907518.5 Examination Report", Feb. 28, 2011, 4 pages.
"UK Application No. 0907518.5 Office Action", Nov. 25, 2011, 4 pages.
"UK Application No. 0907518.5 Search Report", Nov. 25, 2011, 2 pages.
"U.S. Appl. No. 13/442,723 Office Action", Oct. 2, 2014, 4 Pages.
"U.S. Appl. No. 12/445,961 Office Action", Aug. 12, 2011, 17 pages.
"U.S. Appl. No. 13/442,700 Final Office Action", Aug. 20, 2013, 6 Pages.
"U.S. Appl. No. 13/442,700 Office Action", Jun. 14, 2013, 7 Pages.
"U.S. Appl. No. 13/442,723 Final Office Action", Feb. 25, 2015, 7 Pages.
"U.S. Appl. No. 13/442,723 Office Action", May 9, 2014, 9 Pages.
Co-pending U.S. Appl. No. 13/442,700, filed Apr. 9, 2012, 38 Pages.
Co-pending U.S. Appl. No. 13,442,723, filed Apr. 9, 2012, 38 Pages.

\* cited by examiner

WAGERING GAME COMMUNITY ENVIRONMENT

RELATED APPLICATIONS

This application is a continuation of and claims priority benefit of U.S. Non-Provisional application Ser. No. 13/442,723 filed Apr. 9, 2012, which is a continuation application that claims priority benefit of U.S. application Ser. No. 12/445,961 which is a National Stage Application of PCT/US2007/081795 filed Oct. 18, 2007, which claims priority benefit of Provisional U.S. Application No. 60/862,395 filed Oct. 20, 2006.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, Bally Gaming, Inc.

FIELD

Embodiments of the inventive subject matter relate generally to wagering game systems, and more particularly to a wagering game community environment.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

The present invention is illustrated by way of example and not limitation in the Figures of the accompanying drawings in which.

DESCRIPTION OF THE EMBODIMENTS

This description of the embodiments is divided into six sections. The first section provides an introduction to embodiments of the invention, while the second section describes an example operating environment. The third section describes example operations performed by some embodiments and the fourth section describes some additional embodiments in more detail. The fifth section describes wagering game machines in more detail and the sixth section provides some general comments.

Introduction

This section provides an introduction to some embodiments of the invention.

Figure 1:
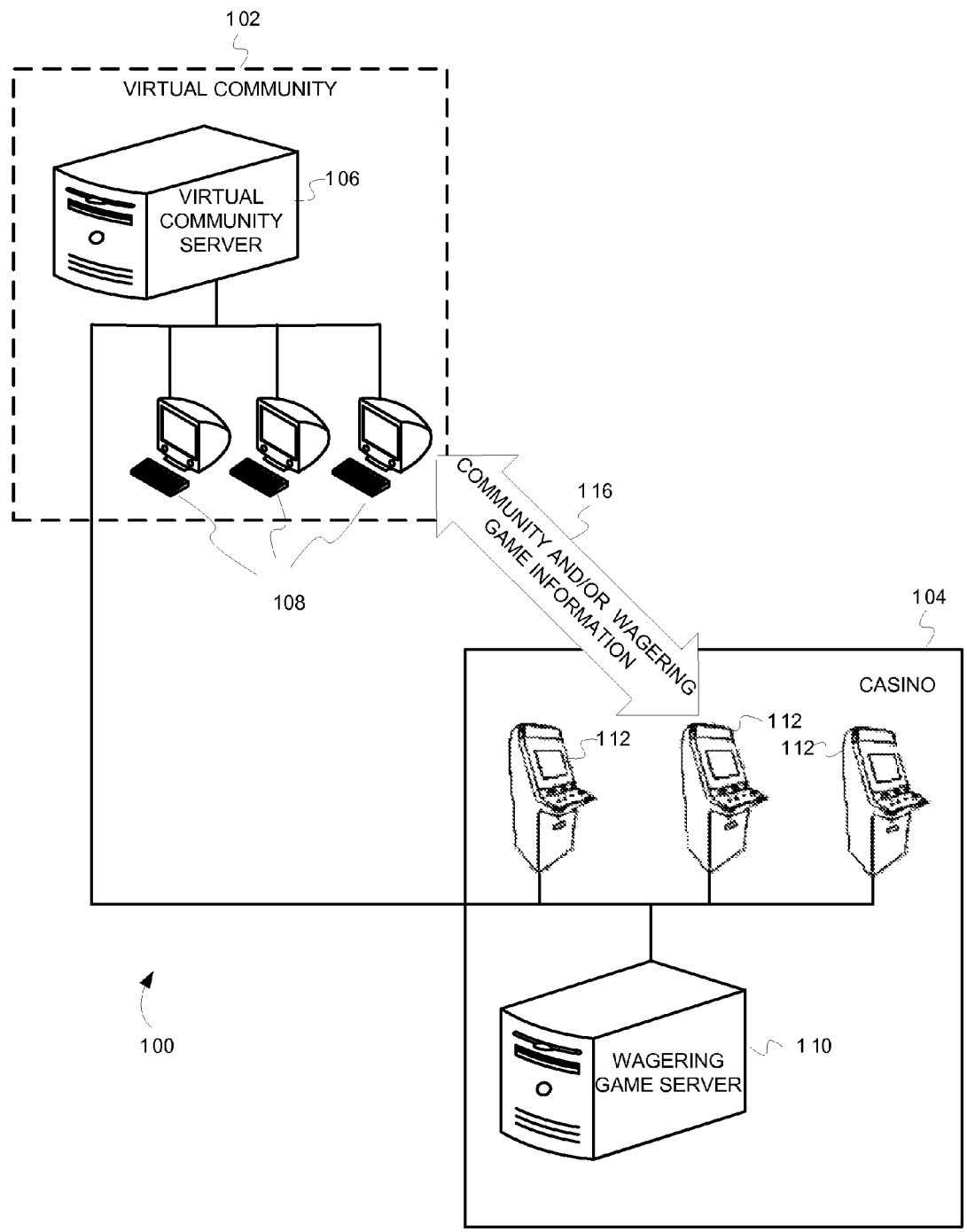
FIG. 1 is a block diagram illustrating dataflow between virtual community members who are online and those who are playing wagering game machines in a casino, according to example embodiments of the invention.

Casino player clubs ("clubs") are often little more than passive tracking systems geared toward individual players. Many clubs track player activities inside casinos and give incentives based on player habits. For example, player clubs may track players' wagering habits and offer incentives to increase wagering. Because many clubs are limited to such tracking-type programs, they often treat their members like service subscribers, rather than members of a true club. Thus, communications between clubs and players are often superficial and impersonal. For example, clubs often notify players about special promotions and complementary merchandise, but they typically do not facilitate communications between club members. Unlike these passive, impersonal clubs, embodiments of the invention facilitate virtual player communities where community members regularly visit, make friends, and interact with each other. Some embodiments enable community members to establish social networks, provide and rate community content, assume community-related identities, and much more. Some embodiments link virtual community environments to real-world casinos. For example, some embodiments enable community members who are online to 1) watch/monitor wagering games being played in casinos; 2) use promotional items acquired in the virtual community in wagering games at casinos; 3) participate in wagering games being played in casinos; and 4) show their online community status when playing wagering games at casinos. FIG. 1 shows one such embodiment.

FIG. 1 is a block diagram illustrating dataflow between virtual community members who are online and those who are playing wagering game machines in a casino, according to example embodiments of the invention. In FIG. 1, the wagering game network 100 includes a virtual community 102 and a casino 104. The virtual community 102 includes a virtual community server 106 and workstations 108. The virtual community server 106 can include a web site and other facilities through which community members can interact with each other. Community members can use the workstations 108 to access the community server's web site and other facilities. In the casino 104, the wagering game machines 112 are connected to a wagering game server 110. The casino components 112 and 110 are connected with the virtual community components 106 and 108.

As shown, the wagering game machines 112 can exchange community information and/or wagering game information 116 with the community server 106 and workstations 108. As a result, community members who are online (i.e., who are using the workstations 108) can interact with community members who are in the casino 104. For example, online members can monitor wagering games and other activities occurring in the casino 104, participate in wagering games occurring in the casino 104, exchange messages with community members who are in the casino 104, and much more. Although FIG. 1 describes some embodiments, many other features and embodiments are described below.

Operating Environment

This section describes an example operating environment and provides structural aspects of some embodiments. This section will discuss wagering game networks, virtual communities, and wagering game network components.

Wagering Game Networks

Figure 2:
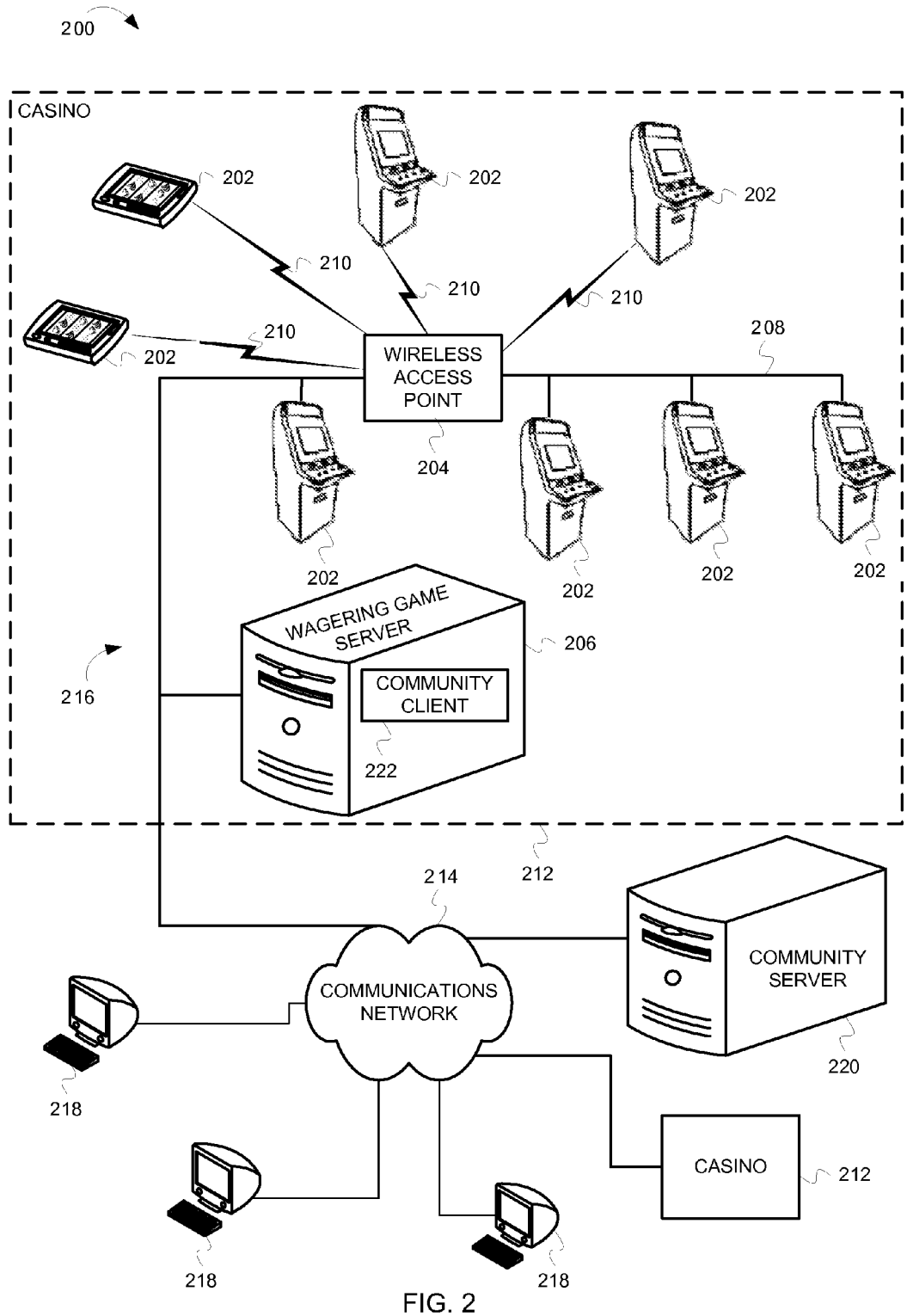
FIG. 2 is a block diagram illustrating a wagering game network in which virtual community members can interact with community members who are in casinos, according to example embodiments of the invention.

FIG. 2 is a block diagram illustrating a wagering game network in which virtual community members can interact with community members who are in casinos, according to example embodiments of the invention. As shown in FIG. 2, the wagering game network 200 includes casinos 212, a community server 220, and community terminals 218, all connected via a communications network 214.

Each casino 212 includes a local area network 216, which includes a wireless access point 204, wagering game machines 202, and a wagering game server 206. The local area network 216 also includes wireless communication links 210 and wired communication links 208. The wired and wireless communication links can employ any suitable connection technology, such as Bluetooth, 802.11, Ethernet, public switched telephone networks, SONET, etc. The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc.

The wagering game server 206 can serve wagering games and/or other content over the local area network 216. The wagering game server 206 includes a community client 222 that can exchange information between the wagering game server 206, the wagering game machines 202, the community server 220, the community terminals 218, and components of other casinos 212.

The community server 220 can provide a wide range of services to members of virtual communities. In some embodiments, the community server 220 can enable community members who are online to interact with each other and with community members who are in the casinos 212. Virtual communities and their services will be described in greater detail below (see the Virtual Communities subsection).

The community terminals 218 enable community members to access virtual communities and other services available from the community server 220 and other network components. The community terminals 218 can be personal computers, workstations, personal digital assistants, or other computing devices. In some embodiments, the community terminals 218 can wirelessly connect to the communications network 214.

In some embodiments, the wagering game network 200 can include other network devices, such as accounting servers, wide area progressive servers, player tracking servers, and/or other devices suitable for use in connection with embodiments of the invention.

Virtual Communities

Virtual communities ("communities") include groups of people who choose to associate and interact with each other via web sites, chat rooms, newsgroups, email, discussion boards or forums, instant messaging, and/or other electronic facilities. Members of a community often share a set of common interests and experience (e.g., an interest in a particular wagering game). According to embodiments, communities offer a rich infrastructure which enables community members to:

Create Social Networks—When creating social networks, members can create electronic associations that inform network members when selected members are: 1) online, 2) performing activities, 3) reaching milestones, 4) etc.

Establish a Reputation—Community members can establish reputations based on feedback from other community members, based on accomplishments in the community, based on who is in their social network, etc.

Provide Content—Community members can provide content by uploading media, designing wagering games, maintaining blogs, etc.

Filter Content—Community members can filter content by rating content, commenting on content, or otherwise distinguishing content.

Interact with Other Members—Community members can interact via newsgroups, e-mail, discussion boards, instant messaging, etc.

Participate in Community Activities—Community members can participate in community activities, such as multi-player games, interactive meetings, discussion groups, real-life meetings, etc.

Any of the components of the wagering game network 200 can include hardware and machine-readable media including instructions for facilitating the features described herein. For example, the community server 220 and community client 222 can include software for hosting virtual community web sites, facilitating communications between community members, facilitating interactions between members who are online and members who are in casinos, and providing other features.

This section continues by describing some wagering game network components.

Community Servers

Figure 3:
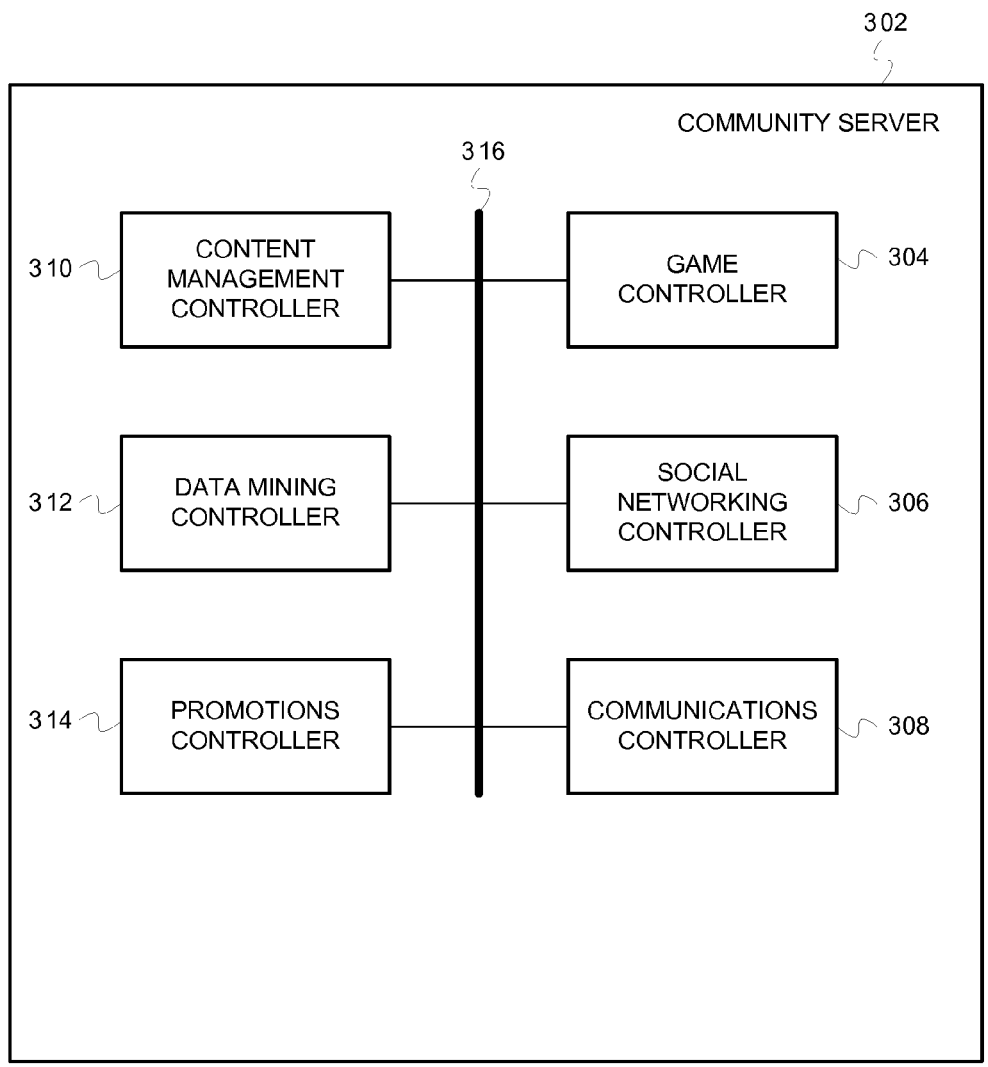
FIG. 3 is a block diagram illustrating a community server, according to example embodiments of the invention.

FIG. 3 is a block diagram illustrating a community server, according to example embodiments of the invention. In FIG. 3, the community server 302 includes a game controller 304, social networking controller 306, communications controller 308, content management controller 310, data mining controller 312, and promotions controller 314. The community server's components can include hardware and/or machine-readable media including instructions that can be executed to perform the operations described herein. The community server's components can communicate with each other via the communication interface 316, which can include a bus, wires, software interfaces, and/or any other suitable interface technology.

The game controller 304 can conduct non-wagering games based on input received from the community terminals 218. The games controller 304 can also facilitate interactions between the community terminals 218 and the wagering game server 206 and/or wagering game machines 202. In some embodiments, the game controller 304 enables online community members to participate in and/or monitor wagering games that are being presented in the casinos 212.

The social networking controller 306 can enable community members to connect with and track each other. For example, the social networking controller 306 can enable community members to select other members to be part of a social network. The networking controller 306 can also enable members of a social network to track what other social network members are doing in a virtual community and a real-world casino. For example, in some embodiments, the networking controller 306 assists in enabling members of a social network to see when network members are playing wagering game machines in a casino, accessing a virtual community web site, achieving milestones (e.g., winning large wagers in a casino), etc.

The communications controller 308 can enable community members to communicate with each other. For example, the communications controller 308 can facilitate e-mail, instant messaging, message boards, and other suitable communication channels. In some embodiments, the communications controller 308 can facilitate delivery of messages between the community terminals 218 and the wagering game machines 202. In some embodiments, the communications controller 308 provides menu-driven messaging options that reduce input (e.g., typing) needed to represent a member's thoughts/expression. In some embodiments, the communications controller 308 learns a player's communication style and provides menu-driven messaging options suited to the player's communication style. Additionally, the communication controller 308 can provide a "quick text" interface that streamlines text input.

The content management controller 310 can store and manage content for a virtual community. For example, in some embodiments, the content management controller 310 can host a web site for a virtual community. Additionally, it can enable community members and administrators to add, delete, and/or modify content for virtual communities. For example, the content management controller 310 can enable community members to post media files, member-designed games, commentaries, etc., all for consumption by members of a virtual community.

The data mining controller 312 can track behavior of community members. In some embodiments, the data mining controller 312 tracks how individuals and/or groups use the services and content available in a virtual community. The data mining controller 312 can analyze member behavior and categorize community members as promoters, connectors, or other types. The data mining controller 312 can configure community servers and other components (e.g., the games controller 304) to customize content based on individual and/or group habits.

The promotions controller 314 can manage various promotions offered to members of a virtual community. For example, the promotions controller 314 can distribute promotional material when members achieve certain accomplishments (e.g., scores for online games) in a virtual community. Members may use some of the promotional material when playing wagering games in a casino.

Wagering Game Machines

This section continues with a description of a wagering game machine architecture.

Figure 4:
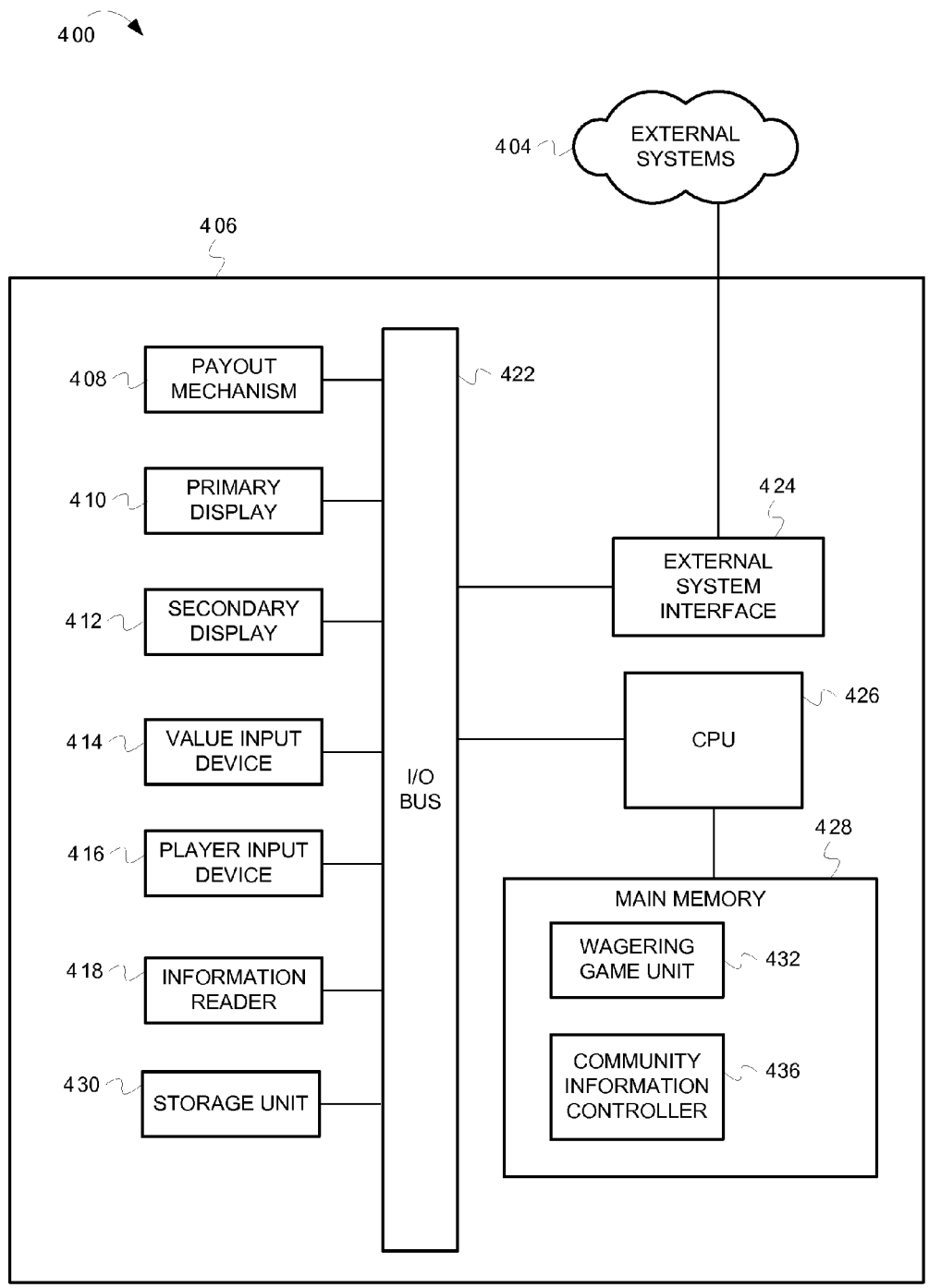
FIG. 4 is a block diagram illustrating a wagering game machine architecture, according to example embodiments of the invention.

FIG. 4 is a block diagram illustrating a wagering game machine architecture, according to example embodiments of the invention. As shown in FIG. 4, the wagering game machine architecture 400 includes a wagering game machine 406, which includes a central processing unit (CPU) 426 connected to main memory 428. The CPU 426 can include any suitable processor, such as an Intel® Pentium processor, Intel® Core 2 Duo processor, AMD Opteron™ processor, UltraSPARC processor, etc. The main memory 428 includes a wagering game unit 432. In some embodiments, the wagering game unit 432 can present wagering games, such as video poker, video black jack, video slots, video lottery, etc., in whole or part. In some embodiments, the community information controller 436 exchanges information with community servers, wagering game servers, and other wagering game network components.

The CPU 426 is connected to an input/output (I/O) bus 422, which can include any suitable bus technologies, such as an AGTL+ frontside bus and a PCI backside bus. The I/O bus 422 is connected to a payout mechanism 408, primary display 410, secondary display 412, value input device 414, player input device 416, information reader 418, and storage unit 430. The player input device 416 can include the value input device 414 to the extent the player input device 416 is used to place wagers. The I/O bus 422 is also connected to an external system interface 424, which is connected to external systems 404 (e.g., wagering game networks).

In one embodiment, the wagering game machine 406 can include additional peripheral devices and/or more than one of each component shown in FIG. 4. For example, in one embodiment, the wagering game machine 406 can include multiple external system interfaces 424 and/or multiple CPUs 426. In one embodiment, any of the components can be integrated or subdivided.

Any component of the architecture 400 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While this section described structural features of some embodiments, the next section describes operations performed by some embodiments of the invention.

Operations

This section describes operations performed by some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel.

Figure 5:
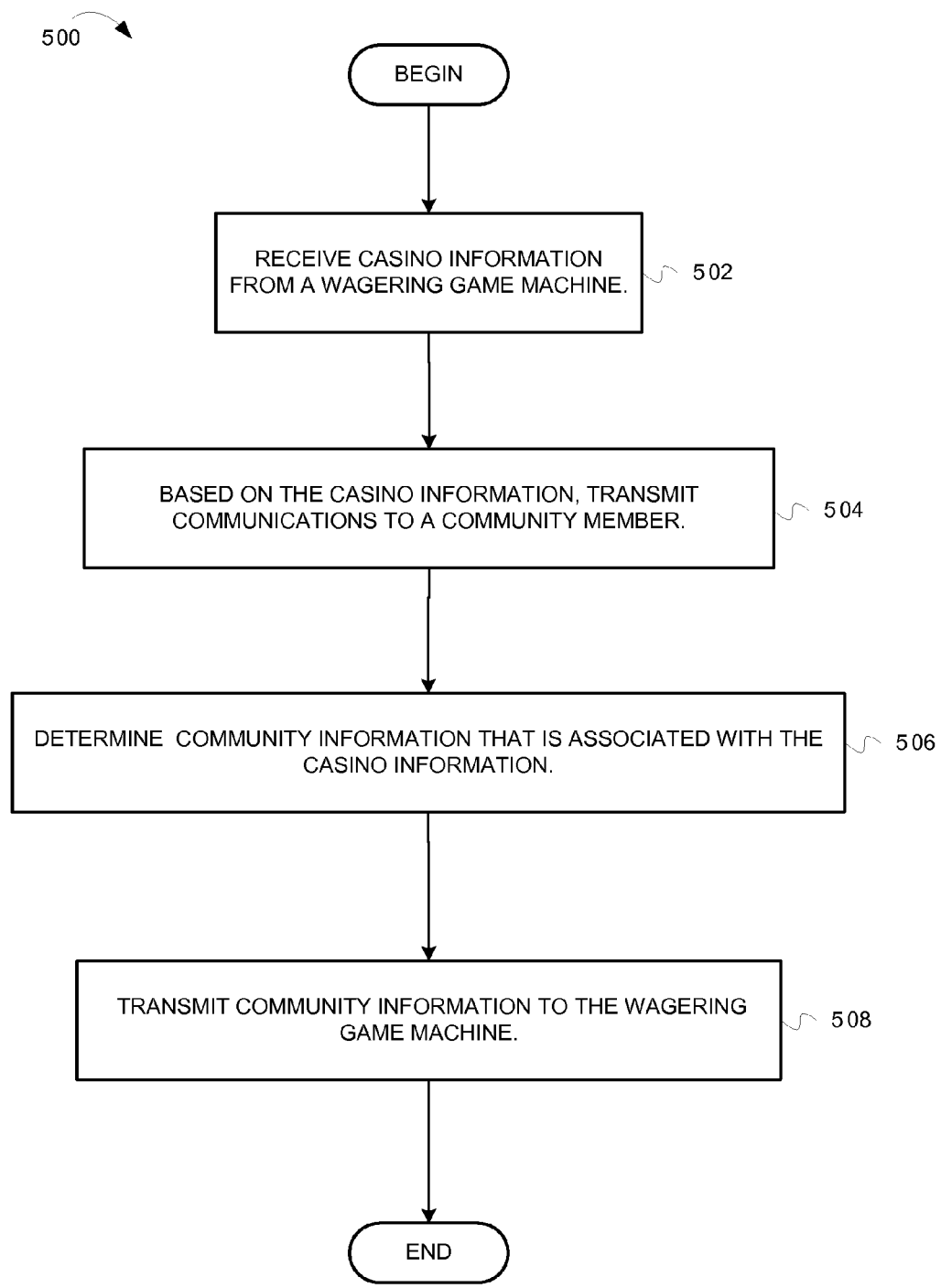
FIG. 5 is a flow diagram illustrating operations for facilitating interactions between members of a virtual community, where some community members are in casinos and others are online.
Figure 6:
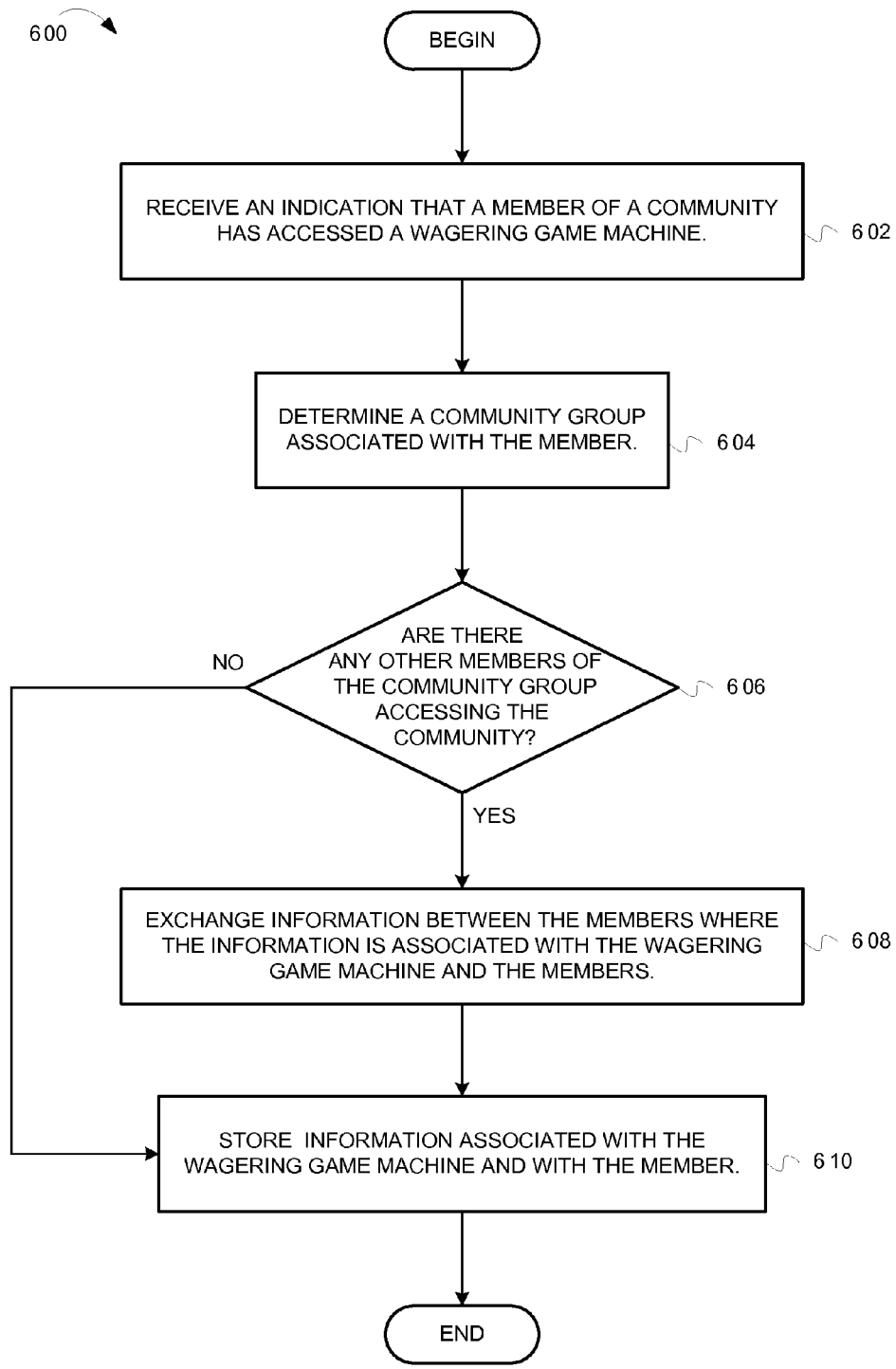
FIG. 6 is a flow diagram illustrating operations for enabling virtual community members to access a virtual community using wagering game machines located in a casino, according to example embodiments of the invention.

The section presents FIGS. 5-8. FIGS. 5 and 6 describe operations typically performed by embodiments of a community server, whereas FIGS. 7 and 8 describe operations typically performed by embodiments of a wagering game machine.

FIG. 5 is a flow diagram illustrating operations for facilitating interactions between members of a virtual community, where some community members are in casinos and others are online. The flow 500 begins at block 502.

At block 502, the community server 220 receives casino information originating at a wagering game machine 202. The casino information can include information associated with wagering games, casino activities, promotional items, community members, etc. The casino information can also include communications from community members playing in the casinos. In some embodiments, the community server 220 can receive casino information from wagering game machines 202 as part of: 1) community members in the casinos 212 sending instant messages, emails, or the like to community members who are not in the casino (e.g., who are online); 2) online community members monitoring/participating-in wagering game activities occurring wholly or partly in a casino; 3) wagering game machines notifying online community members when events occur in the casinos 212; and/or 4) community members in the casinos 212 requesting services from the community server (e.g., community members requesting access to promotional items or game elements that were acquired online.). In other embodiments, the community server 220 can receive casino information from a wagering game server 206. The flow continues at block 504.

At block 504, based on the casino information, the community server 220 transmits communications to a community member. In some embodiments, the community server 220 transmits communications to community members by sending information to the community terminals 218. For example, the community server 220 can deliver e-mail, instant messages, notifications, and other information originating from the casinos 212 to community members who are using the community terminals 218. In some circumstances, there is no need to deliver the casino information to a community member. For example, if the casino information includes a request to use a member's own online game elements in a casino wagering game, the community server 220 could skip block 504. The flow continues at block 506.

At block 506, the community server 220 determines community information associated with the casino information. For example, the community server 220 (e.g., the community server's communications controller 308) can detect that an online community member has sent an instant message responding to the casino information, which included an instant message. Alternatively, the community server 220 may detect a community member's request to use an online game element in a casino wagering game. In response to the detection, the community server 220 determines community information associated with the casino information. The community information can include messages, e-mails, or other communications originating from community members who are online. Additionally, the community information can include an indication or request determined by the community sever 220. For example, the community information can include an indication that a player can use an online game piece or other online material in casino activities. The flow continues at block 508.

At block 508, the community server 220 transmits the community information to the wagering game machine 202. From block 508, the flow ends.

This section continues with a description of how virtual community members can access a virtual community while at a wagering game machine in a casino.

FIG. 6 is a flow diagram illustrating operations for enabling virtual community members to access a virtual community using wagering game machines located in a casino, according to example embodiments of the invention. The flow 600 begins at block 602.

At block 602, the community server 220 receives an indication that a virtual community member has accessed a wagering game machine 202. In some embodiments, players can login to virtual communities by entering user identifiers and authentication information (e.g., passwords, biometric information, etc.) into a graphical user interface on the wagering game machines 202. In some embodiments, the wagering game machine's community information controllers 436 transmits the login information to the community server 220. The flow continues at block 604.

At block 604, the community server's social networking controller 306 determines a community group associated with the virtual community member. For example, the social networking controller 306 determines (e.g., looks up in a table) a set of other virtual community members that have chosen to be associated with the member at the wagering game machine 202. The flow continues at block 606.

At block 606, the community server's social networking controller 306 determines whether other members of the community group are accessing a community (e.g., using the community terminals 218 or wagering game machines 202). If no other community members are accessing the virtual community, the flow continues at block 610. Otherwise, the flow continues at block 608.

At block 608, the community server's communications controller 308 exchanges information between the virtual community members, where the information is associated with the wagering game machine and the members. For example, the communications controller 308 exchanges instant messages between members in the casino and members at the terminals 218. Alternatively, the communications controller 308 can notify community members when members of their social network are accessing the community via wagering game machines 202 or community terminals 218. The flow continues at block 610.

At block 610, the community server's data mining controller 312 stores information associated with the wagering game machine 202 and the virtual community member. For example, the data mining controller 312 can store information about the virtual community member's communications, wagering habits, wagering game preferences, etc. From block 610, the flow ends.

Thus far, this section has described operations which are typically performed by embodiments of a community server. The section continues with a description of operations typically performed by wagering game machines in a casino. In the following discussion, FIG. 7 will describe operations for receiving, information originating from a virtual community, whereas FIG. 8 will describe operations for transmitting information to a virtual community.

Figure 7:
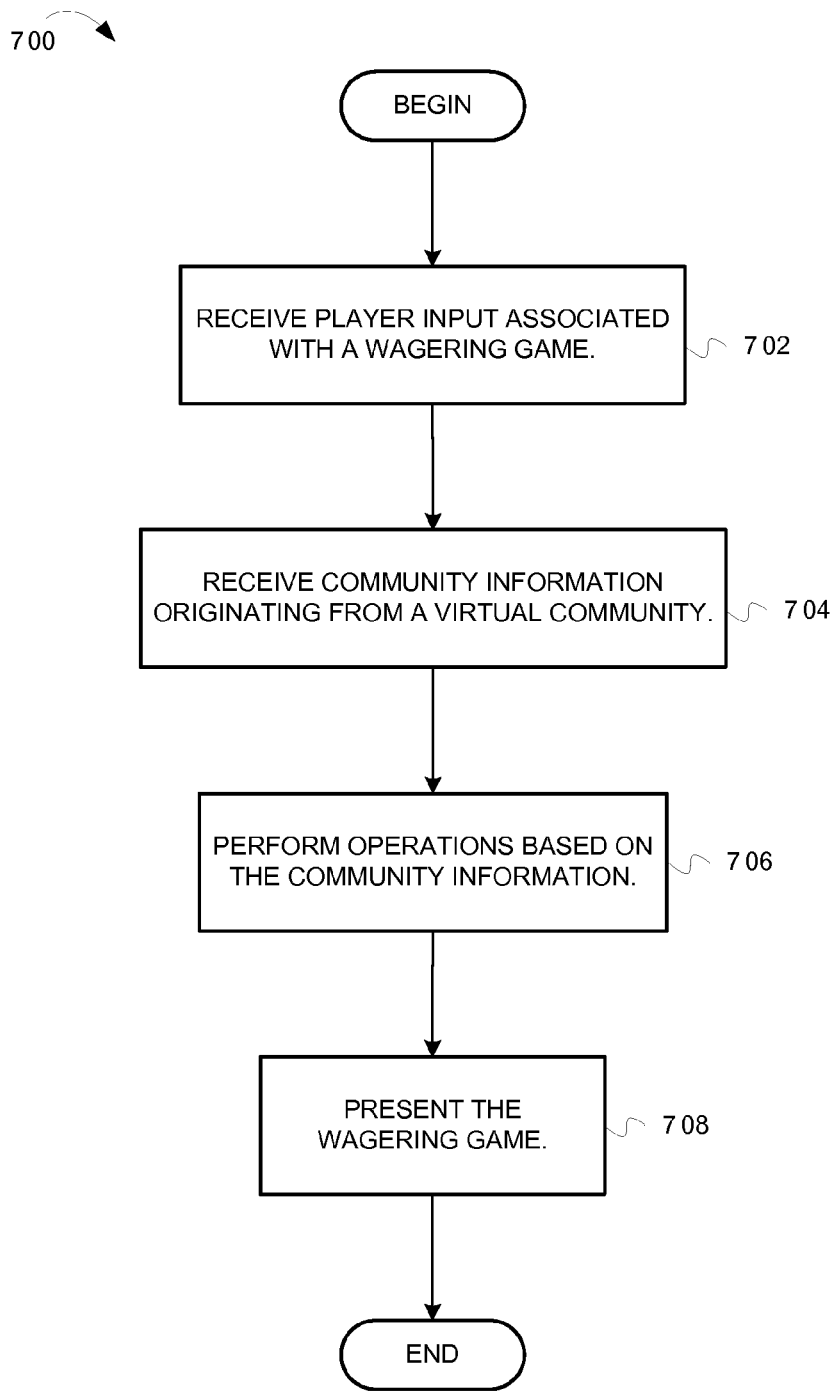
FIG. 7 is a flow diagram illustrating operations for receiving information from a virtual community, where the information is received in a casino, according to example embodiments of the invention.

FIG. 7 is a flow diagram illustrating operations for receiving information from a virtual community, where the information is received in a casino, according to example embodiments of the invention. The flow 700 begins at block 702.

At block 702, the wagering game machine 202 receives player input associated with the wagering game. For example, the wagering game machine receives player input associated with a wagering game. The flow continues at block 704.

At block 704, the wagering game machine 202 receives community information originating from a virtual community. For example, the wagering game machine 202 receives an indication that the player is eligible to use, in the wagering game, game elements acquired online. The community information can include any information from online members (e.g., members using the terminals 218) or the community server 220, such as instant messages, promotional material, notifications (e.g., notifications indicating that members of the player's social network are monitoring the wagering game), etc. The flow continues at block 706.

At block 706, the wagering game machine 202 performs operations based on the community information. For example the wagering game machine 202 allows the player to use game elements acquired online in the wagering game. Alternatively, the wagering game machine 202 can perform other operations based on the community information, such as presenting communications (e.g., instant messages), notifications, promotional material, and/or other suitable output. The flow continues at block 708.

At block 708, the wagering game machine 202 presents the wagering game. For example, the wagering game machine 202 spins the reels for a slots game. In some embodiments, the wagering game machine 202 can use the community information when presenting the wagering game. In some embodiments, the wagering game machine 202 can tailor the presentation according to the community information. From block 708, the flow ends.

The section continues with a discussion of operations for transmitting information to a virtual community.

Figure 8:
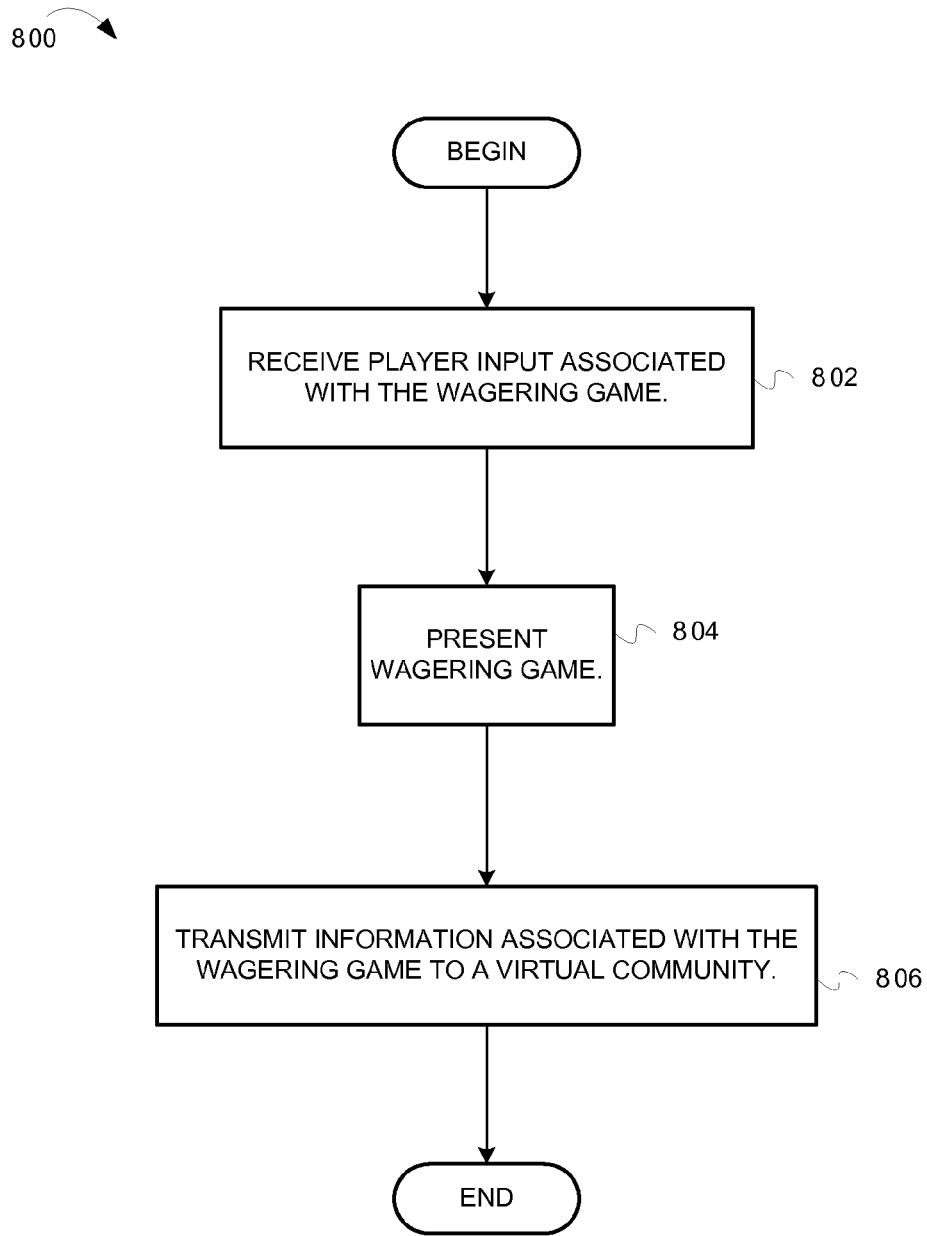
FIG. 8 is a flow diagram illustrating operations for transmitting information from a wagering game in a casino to a virtual community, according to example embodiments of the invention.

FIG. 8 is a flow diagram illustrating operations for transmitting information from a wagering game in a casino to a virtual community, according to example embodiments of the invention. The flow begins at block 802.

At block 802, the wagering game machine 202 receives player input associated with a wagering game. For example, the wagering game machine 202 receives player input indicating that a player wants to spin the reels for a slots game. The flow continues at block 804.

At block 804, the wagering game machine 202 presents the wagering game. The flow continues at block 806.

At block 806, the wagering game machine 202 transmits information associated with the wagering game to a virtual community. For example, the wagering game machine 202 transmits information about the wagering game (e.g., wager amounts, results, etc.) to the community server's data mining controller 312.

In some embodiments, the operation at block 804 is performed before the operation at block 806. For example, the player input may be related to a message (e.g., email or instant message), request, notification, or other communication directed to a virtual community. In some embodiments, the wagering game machine 202 can transmit information to the virtual community (e.g., the community server 220 or the terminals 218) before presenting the wagering game. From block 806, the flow ends.

More Example Embodiments

This section describes additional example embodiments of the invention.

Virtual Communities

Embodiments of the wagering game networks described herein (e.g., see FIG. 2) can offer numerous services and features for virtual communities. In some embodiments, community servers (e.g., game controllers 304) can post "home" versions of casino wagering games. The home versions do no allow players to wager money, but instead allow players to bet online tokens or other virtual commodities. Community servers can also allow virtual community members to design and create their own custom games. In some embodiments, community members can post their custom games for others to play. If a custom game becomes popular, the game designer may receive promotional material, higher status, and/or other recognition for contributing content to the virtual community.

Community servers (e.g., content management controller 310) can host blogs on which virtual community members discuss wagering game strategies, tips, tricks, and other topics of interest to virtual community members. In some embodiments, virtual community members who create blogs, comment on blogs, and/or read blogs receive increased community status, promotional material (e.g., virtual game tokens for use with online games), recognition, etc.

As noted above, community servers (e.g., promotions controllers 314) can reward virtual community members for contributing content to a virtual community. The content can include blogs, ratings, custom games, media files, etc. Additionally, community servers can reward virtual community members for social networking activities, such as building social networks, communicating with members of a social network, recommending members of a social network, etc. In some embodiments, a promotions controller 314 works with a social networking controller 306 and data mining controller 312 to determine rewards for social networking activities.

Interactions between Virtual Communities and Casinos

Embodiments of the wagering game networks described herein (e.g., see FIG. 2) can enable virtual community members who are playing in casinos to interact with virtual community members who are online. Embodiments of the wagering game networks can support the following interactions:

Access Notifications—The wagering game network can notify online community members when a member of their social network is participating in casino activities, such as wagering games, community bonus game, etc. Additionally, the wagering game network can notify online community members when a member of their social network achieves certain accomplishments, such as achieving particular game results, winning monetary awards, winning commodities used in virtual communities, etc. The wagering game network can also notify community members who are in a casino that members of their social network are also in the casino.

Community Games—The wagering game network can enable online community members to participate in activities occurring in the casinos. For example, the wagering game network can enable online players to participate in wagering games occurring on a casino floor. In some embodiments, the online players bet virtual commodities whereas casino players wager money (i.e., credits purchased with money). In other embodiments, the online players and casino players wager money on and participate in the wagering games. Also, the wagering game network can enable online players to join-in community bonus games being conducted on casino wagering game machines. The bonus games can reward online winners differently than winners who are in the casinos. In some embodiments, members of a social networks who are in a casino can play wagering games together (e.g., as co-participants, teammates, adversaries, etc.). In some embodiments the wagering game network enables community members to share game assets. For example, a community member playing in a casino can use game assets from members of a social network. If the community member uses game assets from a social network, the player may share winnings with social network members.

Wagering Game Monitoring—Community members are often interested in how other community members are performing in wagering games at casinos. In some embodiments, online community members can receive real-time media representing wagering games occurring in casinos. The following scenario illustrates one of many ways virtual community members can use the wagering game network's wagering game monitoring features. Bob and Sally are both members of a virtual community. Sally is going to a casino to play slots games. Bob gives Sally $100 to wager on his behalf. In some embodiments, when Bob is online, he can see whether Sally wins when wagering his $100 in a casino. The network's wagering game monitoring features can also enable online community members to bet on (e.g., using virtual commodities) whether players will win in the casinos. In some embodiments, online members can monitor casino wagering games for cheating. If an online member discovers someone cheating in the casino, the online member can alert casino personnel. If the casino catches the cheater, the network can award the online member some benefit, such as promotional material, status badges, etc.

Community Member Communications—The wagering game network can facilitate direct communications between online community members and community members playing in casinos. The communications can include text messaging, voice messaging, e-mail, etc. In some circumstances, casino players can use the network's communications features to ask online community members for advice about wagering games. For example, during a casino video poker game, a player can ask online members about wager amounts, strategies, etc.

Social Networking—The wagering game network can facilitate numerous social networking features. In some embodiments, community members can choose their social networks. However, in some embodiments, community members must qualify to be part of certain social networks. For example, to become part of an elite player's network, community members must win large sums of money or achieve various milestones (e.g., 10 royal flushes in casinos). In some embodiments, when community members win money playing wagering game in casinos, members of their social networks receive promotional material, virtual commodities, increased status, or other benefits. Similarly, when community members receive complimentary benefits resulting from casino activities, members of their social network also receive benefits. Social networks often have degrees of separation. For example, a community member may be related to another community member through a common friend. The wagering game network can provide different rewards and features based on the degree of separation between community members. In some embodiments, the wagering game network enables community members to filter content based on their social network. For example, the network can mark content as having been accessed, approved, rejected, or otherwise rated by members of a social network or community.

Virtual Commodities, Promotions, and Persistent State— As described above, community members can receive virtual commodities, promotional material, game elements associated with casino wagering games, etc. The virtual commodities can include accoutrements for animated characters and avatars, virtual currency, game elements for use in online and/or casino games, online status indicators, etc. Promotional material can include coupons, vouchers, tickets, and other prizes. The wagering game network can also maintain persistent state information associated with casino wagering games. In some embodiments, advertisers or other sponsors can affect wagering games in casinos. For example, advertisers can add to wagers made by community members (in casinos). In some embodiments, community members can acquire virtual commodities and/or promotions for online activities, where the virtual commodities and/or promotions are usable in casino activities, such as wagering games. Similarly, some embodiments enable community members to affect their persistent state via online activities. For example, community members can perform online activities for which they are awarded game elements (e.g., free spins, access codes, etc.), status badges, etc. In some embodiments, the wagering game network enables community members to show online status badges and/or use online game elements for wagering game machines in casinos. In some embodiments, winning games online qualifies community members for wagering games in the casinos.

Content Contributions—The wagering game network can enable community members to contribute content that is accessible in casinos. For example, community members can contribute media files (e.g., video, audio, graphics, etc.) that are used in presenting wagering games in the casinos. In some circumstances, community members can provide photographs online (e.g. via a community terminals 218), where the photographs are used in presenting a bonus event in a casino.

Other Features

In some embodiments, the wagering game network can enable a group of community members to put money or other value in a pot, where the pot is accumulated online. Later, the group of community members can meet in a casino to compete for the pot by playing wagering games.

In some embodiments, the wagering game network (e.g., community server 220) keeps track of community members' casino activities. After each day (or some other time period), the network posts a blog article describing each member's casino activities.

In some embodiments, the wagering game network enables community members to place wagers and determine wagering game results while online, but does not present the results until the community members are in casinos.

In some embodiments, the wagering game network maintains and/or provides access to community member financial accounts. In some embodiments, the wagering game network enables virtual community members who were online to send money to community members in casinos. In some embodiments, while in casinos, community members can access their financial accounts and/or pay for transactions using biometric information, such as a fingerprint.

Example Wagering Game Machines

Figure 9:
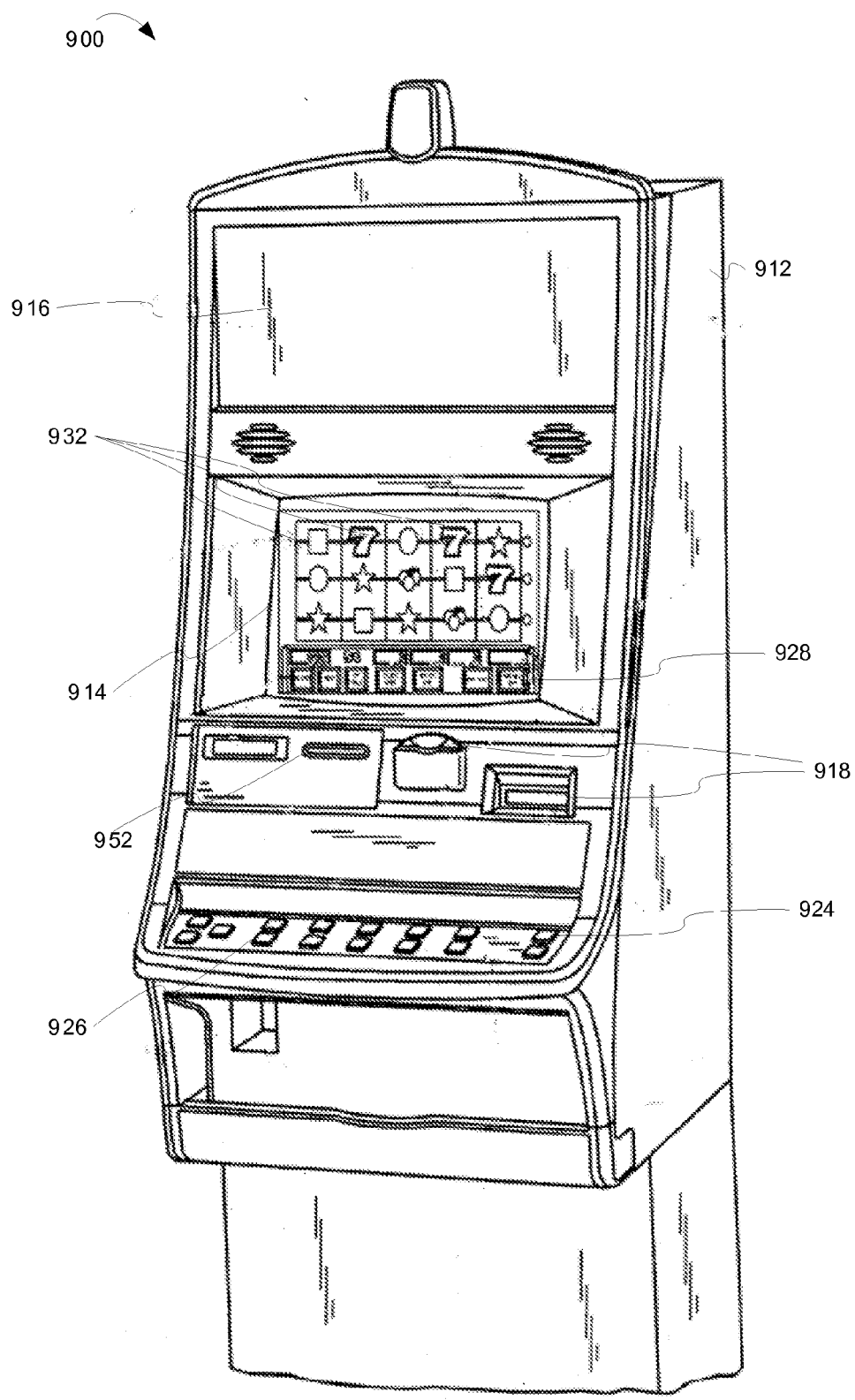
FIG. 9 is a perspective view of a wagering game machine, according to example embodiments of the invention.

FIG. 9 is a perspective view of a wagering game machine, according to example embodiments of the invention. Referring to FIG. 9, a wagering game machine 900 can be used in gaming establishments, such as casinos. According to embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bartop model, mobile handheld model, or workstation console model.

A player begins playing a basic wagering game by making a wager via the value input device 918. The player can initiate play by using the player input device's buttons or touch screen 928. The basic game can include arranging a plurality of symbols along a payline 932, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a gaming system, the gaming system including a community server, and a plurality of wagering game machines at a casino, each respective wagering game machine primarily dedicated to playing at least one respective casino wagering game and configured to interact with the community server, each respective wagering game machine including an electronic display device and one or more electronic input devices, the method comprising:
   detecting, by the community server, online activities in an online virtual community performed by a player via one or more community terminals connected to the community server over a communications network;
   awarding, by the community server and based on the online activities, the player an electronic item for use in the casino wagering game;
   detecting, via at least one of the electronic input devices of a wagering game machine of the plurality of wagering game machines, a physical item associated with a monetary value that establishes a credit balance;
   receiving, by the community server over the communications network, information indicating activity of the player on the wagering game machine;
   transmitting, over the communications network to the wagering game machine, an indication that the electronic item is available for use during the casino wagering game;
   presenting, on the display device of the wagering game machine, an indication that the electronic item is available for use during the casino wagering game;
   initiating, via the wagering game machine, the casino wagering game in response to an input indicative of a wager covered by the credit balance; and
   receiving, via at least one of the one or more electronic input devices of the respective wagering game machine, a cashout input that initiates a payout from the credit balance.

2. The method of claim 1 further comprising:
   transmitting, by the wagering game machine to the community server, other information indicating other activity by the player on the wagering game machine; and
   presenting, by the community server, the other information on the community terminals.

3. The method of claim 1, wherein the online activities include participation in a promotion offered in the online virtual community by the community server.

4. The method of claim 1, wherein the online activities include one or more of providing content to the online community, playing non-wagering games in the online community, or communicating with other players in the online virtual community.

5. The method of claim 1 further comprising:
   receiving, by the wagering game machine, player input indicating use of the electronic item in the casino wagering game; and
   determining, by a wagering game server, a result for the casino wagering game, wherein the result is based, at least in part, on the use of the electronic item.

6. The method of claim 1 further comprising:
   transmitting, by the community server via the communications network, a communication from another player at one of the community terminals to the player at the wagering game machine; and
   presenting, on the display device of the wagering game machine, the communication from the other player.

7. One or more non-transitory machine-readable mediums including computer executable program instructions that, when executed by one or more processors, perform operations for operating a gaming system, the gaming system including a community server, and a plurality of wagering game machines at a casino, each respective wagering game machine primarily dedicated to playing at least one respective casino wagering game and configured to interact with the community server, each respective wagering game machine including an electronic display device and one or more electronic input devices, the instructions comprising:
   instructions to detect, by the community server, online activities in an online virtual community performed by a player via one or more community terminals connected to the community server over a communications network;
   instructions to award, by the community server and based on the online activities, the player an electronic item for use in the casino wagering game;
   instructions to detect, via at least one of the electronic input devices of a wagering game machine of the plurality of wagering game machines, a physical item associated with a monetary value that establishes a credit balance;
   instructions to receive, by the community server over the communications network, information indicating activity of the player on the wagering game machine;
   instructions to transmit, over the communications network to the wagering game machine, an indication that the electronic item is available for use during the casino wagering game;
   instructions to present, on the display device of the wagering game machine, an indication that the electronic item is available for use during the casino wagering game;
   instructions to initiate, via the wagering game machine, the casino wagering game in response to an input indicative of a wager covered by the credit balance; and
   instructions to receive, via at least one of the one or more electronic input devices of the respective wagering game machine, a cashout input that initiates a payout from the credit balance.

8. The one or more non-transitory machine-readable mediums of claim 7 further comprising:
   instructions to transmit, by the wagering game machine to the community server, other information indicating other activity by the player on the wagering game machine; and
   instructions to present, by the community server, the other information on the community terminals.

9. The one or more non-transitory machine-readable mediums of claim 7, wherein the online activities include participation in a promotion offered in the online virtual community by the community server.

10. The one or more non-transitory machine-readable mediums of claim 7, wherein the online activities include one or more of providing content to the online community, playing non-wagering games in the online community, or communicating with other players in the online virtual community.

11. The one or more non-transitory machine-readable mediums of claim 7 further comprising:
   instructions to receive, by the wagering game machine, player input indicating use of the electronic item in the casino wagering game; and
   instructions to determine, by a wagering game server, a result for the casino wagering game, wherein the result is based, at least in part, on the use of the electronic item.

12. The one or more non-transitory machine-readable mediums of claim 7 further comprising:
- instructions to transmit, by the community server via the communications network, a communication from another player at one of the community terminals to the player at the wagering game machine; and
- instructions to present, on the display device of the wagering game machine, the communication from the other player.

13. One or more non-transitory machine-readable mediums including computer executable program instructions that, when executed by one or more processors, perform operations for operating a gaming system, the gaming system including a community server, and a plurality of wagering game machines at a casino, each respective wagering game machine primarily dedicated to playing at least one respective casino wagering game and configured to interact with the community server, each respective wagering game machine including an electronic display device and one or more electronic input devices, the instructions comprising:
- instructions to detect, via at least one of the electronic input devices of a wagering game machine of the plurality of wagering game machines, a physical item associated with a monetary value that establishes a credit balance;
- instructions to initiate, via the wagering game machine, the casino wagering game in response to an input indicative of a wager covered by the credit balance;
- instructions to transmit, by the wagering game machine to the community server, first information indicating player activity related to the casino wagering game;
- instructions to present, by the community server, second information indicating the player activity related to the casino wagering game in an online virtual community, wherein the second information accessible via community terminals connected to the community server via the communications network; and
- instructions to receive, via at least one of the one or more electronic input devices of the respective wagering game machine, a cashout input that initiates a payout from the credit balance.

14. The one or more non-transitory machine-readable mediums of claim 13 further comprising:
- instructions to detect, by the community server, online activities in an online virtual community performed by a player via one or more community terminals connected to the community server over a communications network;
- instructions to award, by the community server and based on the online activities, the player an electronic item for use in the casino wagering game; and
- instructions to transmit, over the communications network to the wagering game machine, an indication that the electronic item is available for use during the casino wagering game;
- instructions to present, on the display device of the wagering game machine, an indication that the electronic item is available for use during the casino wagering game.

15. The non-transitory machine-readable medium of claim 13, wherein the first information is different than the second information.

16. The non-transitory machine-readable medium of claim 13, wherein the first information and the second information are identical.

17. The non-transitory machine-readable medium of claim 13, wherein the community terminals include one or more of wireless mobile devices, desktop computers, lap top computers, or workstations.

* * * * *